(12) United States Patent
Gardner et al.

(10) Patent No.: US 12,136,047 B2
(45) Date of Patent: Nov. 5, 2024

(54) TRANSPORT SHARING AND OWNERSHIP AMONG MULTIPLE ENTITIES

(71) Applicant: TOYOTA MOTOR NORTH AMERICA, INC., Plano, TX (US)

(72) Inventors: Mathew Gardner, Lewisville, TX (US); Eric Randell Schmidt, Northville, MI (US); James H. Kikuma, Plano, TX (US); Nutonya L. Parker, Dallas, TX (US); Evan A. Vijithakumara, Frisco, TX (US); Christopher J. Risberg, Flower Mound, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 774 days.

(21) Appl. No.: 16/446,256

(22) Filed: Jun. 19, 2019

(65) Prior Publication Data

US 2020/0401952 A1 Dec. 24, 2020

(51) Int. Cl.
*G06Q 10/02* (2012.01)
*G06Q 50/40* (2024.01)
*G07C 5/00* (2006.01)
*G07C 5/08* (2006.01)
*H04L 9/32* (2006.01)
*H04L 9/00* (2022.01)

(52) U.S. Cl.
CPC ............. *G06Q 10/02* (2013.01); *G06Q 50/40* (2024.01); *G07C 5/008* (2013.01); *G07C 5/0808* (2013.01); *H04L 9/3236* (2013.01); *G06Q 2220/00* (2013.01); *H04L 9/50* (2022.05); *H04L 2209/56* (2013.01)

(58) Field of Classification Search
None
See application file for complete search history.

(56) References Cited

U.S. PATENT DOCUMENTS 8,244,549 B1 * 8/2012 Stener .................... G06Q 10/02
705/6
8,838,088 B1 * 9/2014 Henn ...................... H04M 3/18
455/411

(Continued)

FOREIGN PATENT DOCUMENTS

CN 204423429 U 6/2015
CN 105278677 A 1/2016

(Continued)

OTHER PUBLICATIONS

Susan A. Shaheen, Mark A. Mallery, Karla J. Kingsley, "Personal vehicle sharing services in North America," Research in Transportation Business & Management, vol. 3, 2012, pp. 71-81, ISSN 2210-5395 (Year: 2012).*

(Continued)

*Primary Examiner* — Paul R Fisher

(57) ABSTRACT

An example operation may include one or more of assigning a fractional ownership of a transport, receiving, at a server, sensor data associated with one or more of the transport and a device proximate to the transport, determining a condition of the transport, based on the sensor data, updating the fractional ownership of the transport based on the condition, and providing a responsibility based on the fractional ownership.

17 Claims, 16 Drawing Sheets

(56) References Cited

U.S. PATENT DOCUMENTS

| | | | |
|---|---|---|---|
| 9,488,982 B2* | 11/2016 | Gurin | G06Q 10/02 |
| 9,952,600 B2 | 4/2018 | Gurin | |
| 10,664,920 B1 | 5/2020 | Roll et al. | |
| 10,891,686 B1* | 1/2021 | Rao | G06Q 40/08 |
| 10,956,982 B1* | 3/2021 | Hayward | G06Q 40/08 |
| 2002/0194037 A1* | 12/2002 | Creed | G06Q 10/02 |
| | | | 705/5 |
| 2003/0055779 A1* | 3/2003 | Wolf | G06Q 30/0202 |
| | | | 705/39 |
| 2004/0254830 A1* | 12/2004 | Gardiner | G06Q 10/06 |
| | | | 705/13 |
| 2005/0075829 A1* | 4/2005 | Polimadei | G07C 5/00 |
| | | | 702/165 |
| 2007/0247717 A1* | 10/2007 | Konno | G02B 27/01 |
| | | | 359/613 |
| 2008/0243558 A1 | 10/2008 | Gupte | |
| 2008/0249829 A1* | 10/2008 | Vicino | G06Q 10/1097 |
| | | | 705/7.24 |
| 2009/0164400 A1 | 6/2009 | Amer-Yahia et al. | |
| 2010/0001558 A1 | 1/2010 | Petrovski | |
| 2011/0004570 A1* | 1/2011 | Saad | G06Q 30/06 |
| | | | 705/500 |
| 2013/0006675 A1* | 1/2013 | Bowne | G01S 19/13 |
| | | | 705/4 |
| 2013/0073473 A1 | 3/2013 | Heath | |
| 2014/0149145 A1* | 5/2014 | Peng | G06F 3/0346 |
| | | | 702/150 |
| 2015/0019362 A1 | 1/2015 | Chan | |
| 2015/0100195 A1* | 4/2015 | Kelly, III | G07C 5/0808 |
| | | | 701/29.1 |
| 2015/0170253 A1 | 6/2015 | Kim et al. | |
| 2016/0320198 A1* | 11/2016 | Liu | G01C 21/3438 |
| 2017/0046792 A1* | 2/2017 | Haldenby | G06Q 20/4016 |
| 2017/0116680 A1* | 4/2017 | Merritt, Jr. | G06Q 40/12 |
| 2018/0018723 A1* | 1/2018 | Nagla | H04L 9/3236 |
| 2018/0108189 A1* | 4/2018 | Park | G07C 5/008 |
| 2020/0036533 A1* | 1/2020 | Soundararajan | H04W 12/104 |
| 2020/0372428 A1 | 11/2020 | Liu et al. | |

FOREIGN PATENT DOCUMENTS

| | | | | |
|---|---|---|---|---|
| CN | 102667655 B | 10/2016 | | |
| CN | 106056430 A | 10/2016 | | |
| CN | 106097031 A | 11/2016 | | |
| CN | 106101165 A | 11/2016 | | |
| CN | 107330756 A | 11/2017 | | |
| CN | 108701324 A | 10/2018 | | |
| EP | 2905737 A1 | 8/2015 | | |
| WO | WO02089077 A1 * | 11/2002 | | G06F 7/00 |
| WO | WO2008103901 A1 * | 8/2008 | | G06Q 40/00 |
| WO | WO2010144490 A1 * | 12/2010 | | G06Q 10/00 |
| WO | WO2015042650 A1 * | 4/2015 | | G06Q 10/02 |
| WO | WO2017142536 A1 * | 8/2017 | | G01C 21/34 |
| WO | WO2019021019 A1 * | 1/2019 | | G06Q 20/02 |
| WO | WO2019120493 A1 * | 6/2019 | | H04W 12/06 |

OTHER PUBLICATIONS

Rajat Rajbhandari, PD, "Exploring Blockchain—Technology Behind Bitcoin and Implications for Transforming Transportation, Final Report", Texas A&M Transportation Institute, Jan. 2018 (Year: 2018).*

IBM Globalization—Terminology—terms S, https://web.archive.org/web/20111003082830/http://www-01.ibm.com/software/globalization/terminology/s.html Oct. 3, 2011 (Year: 2011).*

Connie Loizos, "Can Fractional Car Ownership Work?", https://techcrunch.com/2016/01/27/can-fractional-car-ownership-work/ , TechCrunch+, Jan. 27, 2016. (Year: 2016).*

Hon Chu, V. Raman, J. Shen, A. Kansal, V. Bahl and R. R. Choudhury, "I am a smartphone and I know my user is driving," 2014 Sixth International Conference on Communication Systems and Networks (COMSNETS), Bangalore, India, 2014, pp. 1-8 (Year: 2014).*

Wilcox, Gregory J., and Drive Time. "Exotic Car Club Offers Shared Ownership." Daily Breeze, 2008 Jul. 24, 2008 (Year: 2008).*

Anonymous, "Social and Psychological Factors Affecting Borrowing Behaviour: A Review", LoanBase your finance specialists; Jun. 4, 2018,https://loanbase.com.au/blog/psychosocial-borrowing.

Fenwick, "How's your social credit score?", Jun. 2018, http://www.hult.edu/blog/your-social-credit-score/.

Galeon, "China's "Social Credit System" Will Rate How Valuable You Are as a Human. What people can and can't do will depend on how high their "citizen score" is", Dec. 2, 2017,https://futurism.com/china-social-credit-system-rate-human-value.

Tereshchenko, "Blockchain and Smart Contracts in Cargo Transportation", pp. 163-165, 2018.

* cited by examiner

700

TRANSPORT SHARING AND OWNERSHIP AMONG MULTIPLE ENTITIES

TECHNICAL FIELD

This application generally relates to services for transports, and more particularly, to transport sharing and ownership among multiple entities.

BACKGROUND

Vehicles or transports, such as cars, motorcycles, trucks, planes, trains, etc., are generally providing transportation needs to various occupants in a variety of ways. Transports may be identified and utilized by various computing devices, such as a smartphone or a computer.

Transports are generally owned by a single entity. Usage of transports varies from one user to another. The owner may not use the transport enough to warrant owning the transport for exclusive use.

The ownership of transports may be shared by more than one entity and the ownership may be based on an amount of usage or anticipated usage of multiple different entities.

SUMMARY

One example embodiment may provide a method that includes one or more of assigning a fractional ownership of a transport, receiving, at a server, sensor data associated with one or more of the transport and a device proximate to the transport, determining a condition of the transport, based on the sensor data, updating the fractional ownership of the transport based on the condition, and providing a responsibility based on the fractional ownership.

Another example embodiment may provide a system that includes a server configured to perform one or more of assign a fractional ownership of a transport, receive sensor data associated with one or more of the transport and a device proximate to the transport, determine a condition of the transport, based on the sensor data, update the fractional ownership of the transport based on the condition, and provide a responsibility based on the fractional ownership.

A further example operation may include a non-transitory computer readable medium comprising instructions, that when read by a processor, cause the processor to perform one or more of assigning a fractional ownership of a transport, receiving, at a server, sensor data associated with one or more of the transport and a device proximate to the transport, determining a condition of the transport, based on the sensor data, updating the fractional ownership of the transport based on the condition, and providing a responsibility based on the fractional ownership.

A yet further example operation may include one or more of applying a user profile to one or more transports and a transport management database, monitoring user requirements and user usage of the one or more transports over a period of time, identifying a plurality of transport profiles stored in a transport availability pool of the transport management database, identifying a proposed fractional ownership of one or more of a plurality of transports identified in the transport availability pool based on the monitored user requirements and user usage of the one or more transports, and providing the proposed fractional ownership of the one or more of a plurality of transports identified in the transport availability pool to a user device associated with the user.

A yet further example operation may include a server configured to perform one or more of apply a user profile to one or more transports and a transport management database, monitor user requirements and user usage of the one or more transports over a period of time, identify a plurality of transport profiles stored in a transport availability pool of the transport management database, identify a proposed fractional ownership of one or more of a plurality of transports identified in the transport availability pool based on the monitored user requirements and user usage of the one or more transports, and provide the proposed fractional ownership of the one or more of a plurality of transports identified in the transport availability pool to a user device associated with the user.

A yet further example operation may include a non-transitory computer readable medium comprising instructions, that when read by a processor, cause the processor to perform one or more of applying a user profile to one or more transports and a transport management database, monitoring user requirements and user usage of the one or more transports over a period of time, identifying a plurality of transport profiles stored in a transport availability pool of the transport management database, identifying a proposed fractional ownership of one or more of a plurality of transports identified in the transport availability pool based on the monitored user requirements and user usage of the one or more transports, and providing the proposed fractional ownership of the one or more of a plurality of transports identified in the transport availability pool to a user device associated with the user.

DETAILED DESCRIPTION

Figure 1A:
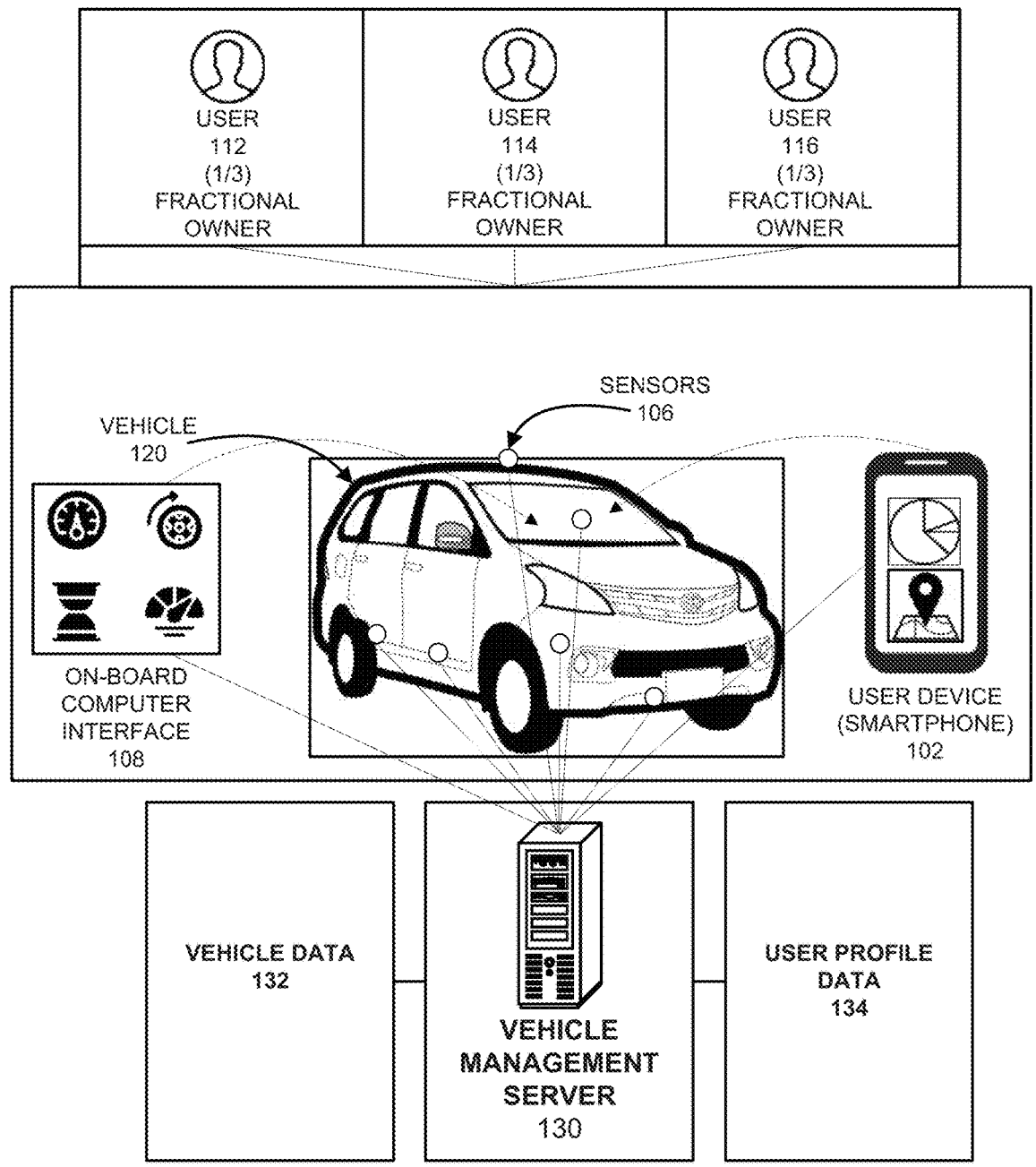
FIG. 1A illustrates a network diagram of a transport fractional ownership management configuration, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout least this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) a data collection system, a data monitoring system, a verification system, an authorization system and a vehicle data distribution system. The vehicle status condition data, received in the form of communication update messages, such as wireless data network communications and/or wired communication messages, may be received and processed to identify vehicle/transport status conditions and provide feedback as to the condition changes of a transport, such as whether the condition was worsened, whether miles were added, etc. In one example, a user profile may be applied to a particular transport/vehicle to authorize a current vehicle event, service stops at service stations, and to authorize subsequent vehicle rental/ownership services. Owners may share ownership of a vehicle through fractional ownership, which may be managed via initial ownership contracts as well as monitored usage and vehicle condition updates which are performed autonomously and periodically.

Within the communication infrastructure, a decentralized database is a distributed storage system which includes multiple nodes that communicate with each other. A blockchain is an example of a decentralized database which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permission-less blockchain, anyone can participate without a specific identity. Public blockchains can involve cryptocurrencies and use consensus based on various protocols such as proof of work (PoW). On the other hand, a permissioned blockchain database provides a system which can secure interactions among a group of entities which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for user profiles to be affiliated with certain vehicles or vehicle pools of available vehicles so the users can access, use, own, partially/ fractionally own, trade, buy and sell vehicles. In operation, a user may access a fractional ownership obligation to own a portion of a vehicle so the vehicle can be accessed and used when the user deems appropriate. In order to monitor the vehicle's use and make determinations about enforcing a fractional ownership and/or modification to a fractional ownership, the vehicle's previous, current and future status may be monitored via vehicle sensors disposed on the vehicle. The vehicle condition may be monitored via one or more sensors which report sensed data to a central controller computer device in the vehicle, which in turn, is forwarded to a management server for review and action.

A sensor may be located on one or more of the interiors of the transport, the exterior of the transport, on a fixed object apart from the transport, and on another transport near to the transport. The sensor may also be associated with the transport's speed, the transport's braking, the transport's acceleration, fuel levels, service needs, the gear-shifting of the transport, the transport's steering, and the like. The notion of a sensor may also be a device, such as a mobile device. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group. Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event, identify changes in the vehicle status, and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

Data shared and received may be stored in a database which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

FIG. 1A illustrates a network diagram of a transport fractional ownership management configuration, according to example embodiments. Referring to FIG. 1A, the network diagram 100 includes a user device 102 operating with a transport/vehicle 120, such as in the event of accessing and/or requesting access to a vehicle service. The vehicle 120 may be a rented, owned, partially/fractionally owned (i.e., subject to other owners), autonomously driven by a non-present driver, semi-autonomously driven by a driver or driven by a conventional manual vehicle operator. In operation, the vehicle 120 may be driven by a user. The vehicle event (i.e., driving event) may be monitored via on-board sensors 106, which provide vehicle status data to the on-board computer 108 and/or the user device 102.

The device 102 may be identified when the device 102 is identified as being with or inside the vehicle 120. As the vehicle is operated, the vehicle management server 130 may maintain a record of the current user's fractional ownership. For instance, in this example, the vehicle 120 may be fractionally owned by three users 112, 114 and 116, via respective ⅓ ownership rights to use the vehicle in a manner that equates to ⅓ of the time or based on other variables indicating an amount of usage permitted for the ⅓ ownership. Each time a user, such as user 112, uses the vehicle the server 130 may receive the user profile, which is identified from the user's device 102, and which is linked to an account with the server 130. The sensors may monitor the vehicle during use for usage, unexpected conditions, etc. The vehicle data 132 may be a separate record which indicates a current status of the vehicle, and the user profile data 134 may be a record of data that is updated to include the fractional ownership, usage, and other data linked to each user account.

When a fractional ownership is identified with a particular user profile, and the user is observed engaging in the operation of the vehicle 120, the fractional ownership may change depending on the monitored usage over time. For example, the original ownership may have identified the three users 112, 114 and 116 as equal owners to the vehicle. The owners may use the vehicle at different times during a given day, week, month, year, etc. In one example, an owner may be a 7 am-3 pm employee using the vehicle to commute to work, while another user may be a 9 am-5 pm employee using the vehicle to travel to work. The vehicle may autonomously drive itself to the second owner's house after the first owner is completed with the vehicle for the day. The third owner may be a 10 am to 2 pm user, that uses the vehicle exclusively for those hours. Also, another user may be a night time user which uses the vehicle at night, thus enabling a fourth potential user/fractional owner in this scenario.

Continuing with the same example, when a user operates the vehicle, the vehicle's current and future condition are identified and logged for usage determinations. For example, a user may use the vehicle quite infrequently, such as for 20 minutes a day five times a week, when in fact they have the right to use the vehicle for 4 hours or more per day. Such a scenario may cause a point system to credit that user with additional points which can be applied to their monthly compensation responsibility, another transport fractional ownership, etc. However, the reverse may occur, and a user may use the vehicle non-stop for the periods they are permitted to use the vehicle. In that example, the user may exceed a maximum amount of permitted usage and thus the user's profile may be automatically adjusted to suggest a larger ownership right, require additional compensation, etc. Additionally, the vehicle condition or vehicle sensor data may be tracked during user usage periods to identify the types of usage, an amount of usage, etc. For example, if a user has been using a standard vehicle to drive in off-road conditions, has a large amount of cargo or passengers, then the amount of high yield usage may require an additional fractional ownership adjustment, which exceeds that particular user's current ownership agreement.

The vehicle sensors may be hardwired to a central controller, or on-board transport computer, or other processor associated with the vehicle, or may instead be providing wireless communications with the central controller of the vehicle's computer via various wireless communication protocols. The data may be transmitted from the central controller/computer, a user's smartphone 102, and/or via a cellular compatible device, etc. The sensor content and different sensor data types may include one or more of a radio station selection, recorded audio, mobile device usage within the vehicle, telephone calls conducted inside the vehicle, browser history of at least one of the computing devices, purchases conducted via at least one computing device inside the vehicle, movement of the vehicle, navigation of the vehicle, a collision of the vehicle, speed of the transport, acceleration of the vehicle, diagnostics associated with the transport including battery charge level, gasoline level, oil level, temperature of the vehicle, location of the vehicle, detected traffic near the vehicle, information regarding other vehicles, etc. The sensor data may be collected and stored for analysis and transaction recording.

The types of sensors which may be included with the vehicles may include one or more of movement sensors, sonar sensors, lidar sensors, accelerometers, touch sensors, proximity sensors, temperature sensors, speed sensors, sound sensors, infrared sensors, collision sensors, level sensors, tire pressure sensors, location determination sensors, ultrasonic sensors, camera sensors, activity sensors, chemical sensors, fluid sensors, pressure sensors, optical sensors, biometric sensors, and the like.

As noted previously, the vehicle 120 may be a vehicle operated by a human driver or an autonomous vehicle operated by a computer and/or remote agent designed for users to ride in during a transport event. The vehicle sensor data may be collected via a plurality of the vehicle sensors. The controller device (i.e., on-board computer and/or user smartphone, etc.) may identify the sensor type, sensor identifier and instances of sensor data received for those parameters. The collection of sensor data may create one or more sets of sensor data. For example, sensors S1, S2, S3 . . . Sn, may generate sensor data sets SD1, SD2, SD3 . . . SDn. Those sensor data sets may include multiple iterations of sensor data over a fixed period of time (e.g., milliseconds, seconds, minutes, hours, etc.) or short instances of extreme measurements, such as only instances of large deviations from expected values to identify, for example, an accident, a hole in the road, braking, extreme conditions or maneuvers, the need for service, etc.

Owners of autonomous/non-autonomous vehicles (or occupants of the vehicles) may register their personal profiles in a shared distributed ledger or other data management system so the information collected during sensor collection efforts may be shared. The smart contract may identify the parties of the agreement, permissions for vehicle occupants, types of data, current profile statuses, sensor thresholds associated with vehicle damages/liability and service needs, and other parameters. The immutability of the sensor data may also be preserved via the shared ledger format of a blockchain.

Figure 1B:
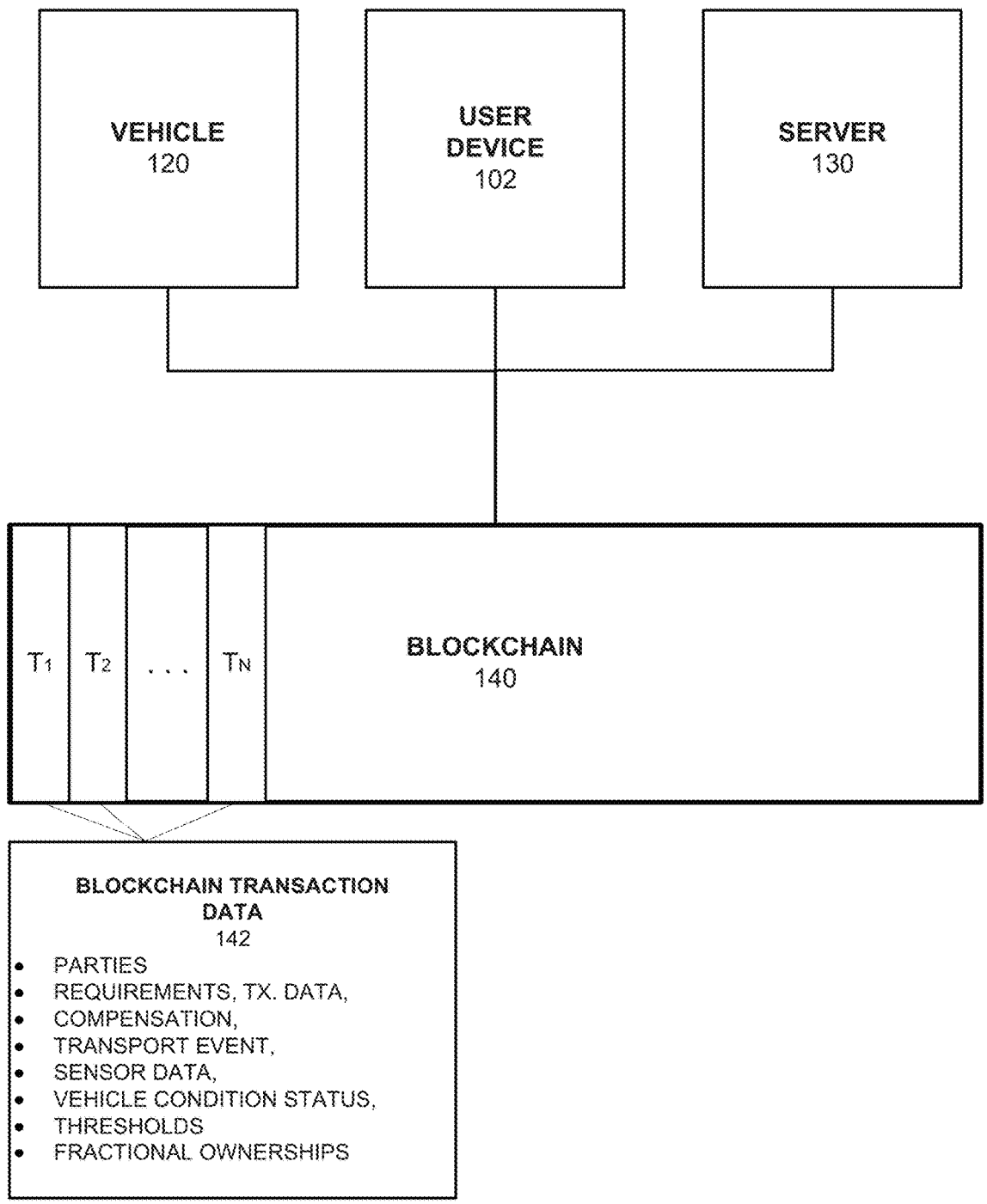
FIG. 1B illustrates a blockchain configuration for storing blockchain transaction data, according to example embodiments.

FIG. 1B illustrates a blockchain configuration for storing blockchain transaction data, according to example embodiments. Referring to FIG. 1B, the example configuration 150 provides for the vehicle 120, the user device 102 and a server 130 sharing information with a distributed ledger (i.e., blockchain) 140. The server may represent a service provider entity inquiring with a vehicle service provider to share user profile rating information in the event that a known and established user profile is attempting to rent a vehicle with an established rated profile. The server 130 may be receiving and processing data related to a vehicle's condition usage. As the vehicle usage events occur, the vehicle sensor data may indicate a need for fuel/charge, a maintenance service, etc., a smart contract may be used to invoke rules, thresholds, sensor information gathering, etc., which may be used to invoke the vehicle service event. The blockchain transaction data 142 is saved for each transaction, such as the access event, the subsequent updates to a vehicle's service status, event updates, etc. The transactions may include the parties, the requirements (e.g., 18 years of age, service eligible candidate, valid driver's license, registered fractional owners, etc.), compensation levels, the distance traveled during the events, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 1C:
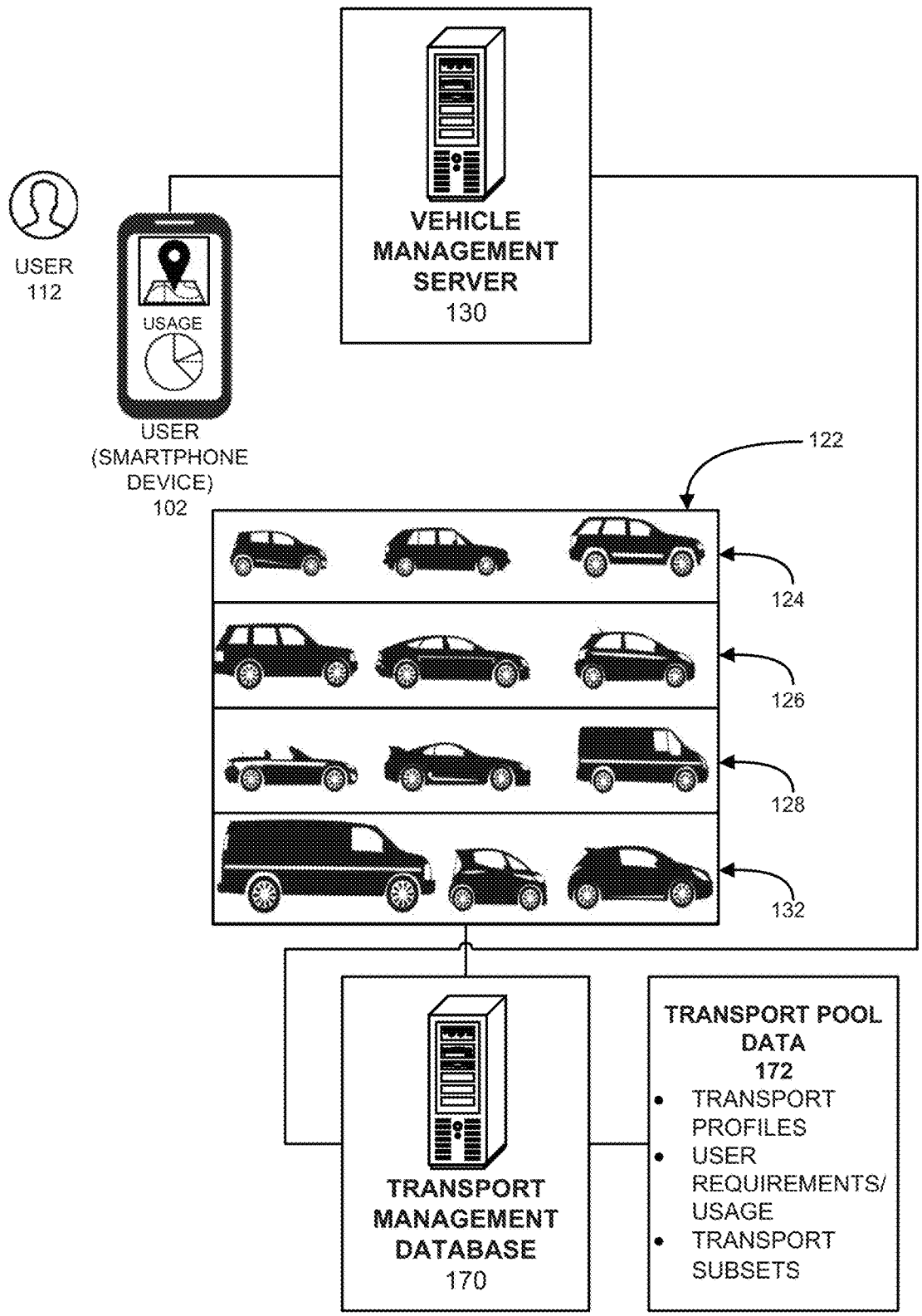
FIG. 1C illustrates a transport fractional ownership management pool configuration, according to example embodiments.

FIG. 1C illustrates a transport fractional ownership management pool configuration, according to example embodiments. Referring to FIG. 1C, the transport may be a current or recently used transport that is fractionally owned by a current user 112 operating a smartphone device 102. The configuration 160 includes the user 112 having access to the vehicle, such as, for example via a fractional ownership managed via the vehicle management server 130 and/or a transport management database 170. The vehicle management server 130 may receive updates about the vehicle's status, such as a current condition data indicating the amount of usage and/or changes to the vehicle's status. In this example, the user may be eligible to receive access to a pool of transports 122. The pool may contain subsets of available transports 124, 126, 128 and/or 132. If a user's usage of a transport identifies a need for a larger, faster, smaller transport, then a suggestion may be created to have the user select a more suitable transport. For example, some of the smaller vehicles may not be ideal for backseat passengers. In the event that the user is operating the vehicle 120 in a manner that suggests via the sensor information, that the transport should be upgraded/downgraded than an autonomous fractional ownership adjustment may be proposed for approval. For instance, if the user is carrying larger weighted loads, than a vehicle with a larger capacity suspension may be identified, based on the sensor data detected during previous usage events, for an upgrade to the current fractional ownership. A user may fractionally own a subset of transports in the pool 122, collectively which equal a full ownership agreement. The transport pool data 172 may include transport profiles, which identify the capacity and suggested usage data of any one transport in the pool 122, user requirements/usage associated with any of the user's fractional ownership agreements, and the organized transport subsets and the requirements and usage capacities of the transports in the subset pool.

Figure 2A:
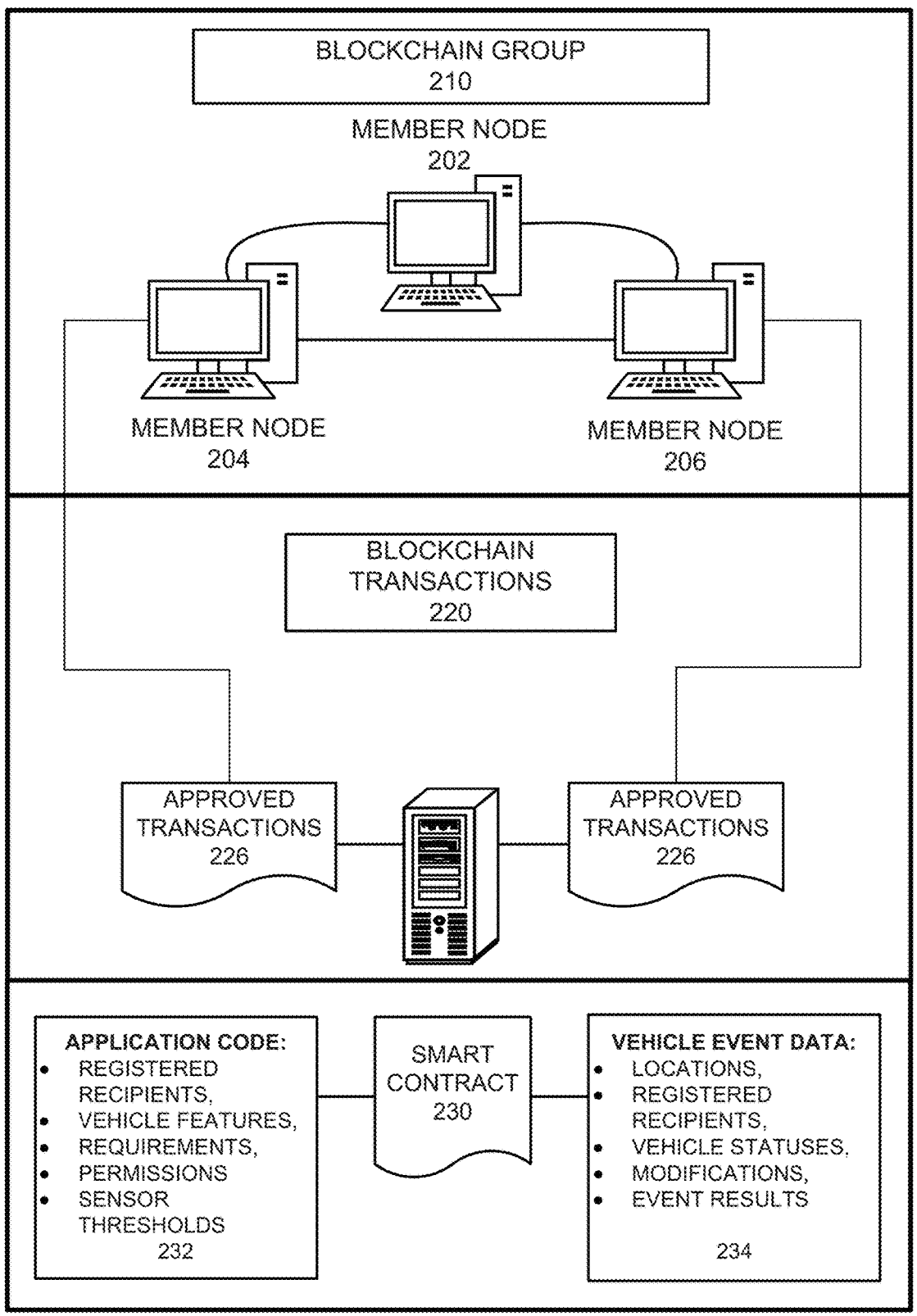
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain member nodes 202-206 as part of a blockchain group 210. The blockchain group may be permissioned or permissionless, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 220 are stored in memory of computers as the transactions are received and approved by the consensus model dictated by the members' nodes. Approved transactions 226 are stored in current blocks of the blockchain and committed to the blockchain via a committal procedure which includes performing a hash of the data contents of the transactions in a current block and referencing a previous hash of a previous block. Within the blockchain, one or more smart contracts 230 may exist that define the terms of transaction agreements and actions included in smart contract executable application code 232. The code may be configured to identify whether requesting entities and fractional owners are registered to receive access to certain vehicle, what features they are entitled/required to receive given their profile statuses and whether to monitor their actions and condition data in subsequent vehicle events. For example, when a user is using a vehicle for a period of time (i.e., one week), the sensor data monitoring may be triggered, and a certain parameter, such as a vehicle usage level, may be identified as being above/below a particular threshold for a particular period of time, then the result may be a change to a current fractional ownership, which requires an alert to be sent to the managing party (i.e., vehicle owner, vehicle operator, server, etc.) so the new fractional ownership agreement can be identified and stored for reference. The vehicle sensor data collected may be based on types of sensor data used to collect information about a vehicle's status. The sensor data may also be the basis for the vehicle event data 234, such as a location(s) to be traveled, an average speed, a top speed, acceleration rates, whether there were any collisions, was the expected route taken, what is the next destination, whether safety measures are in place, whether the vehicle can support the average passenger and cargo loads, whether the roads driven are suitable for such a transport, etc. All such information may be the basis of smart contract terms 230, which are then stored in a blockchain. For example, sensor thresholds stored in the smart contract can be used as the basis for whether a fractional ownership adjustment is necessary which users are required to have their fractional ownerships modified.

Figure 2B:
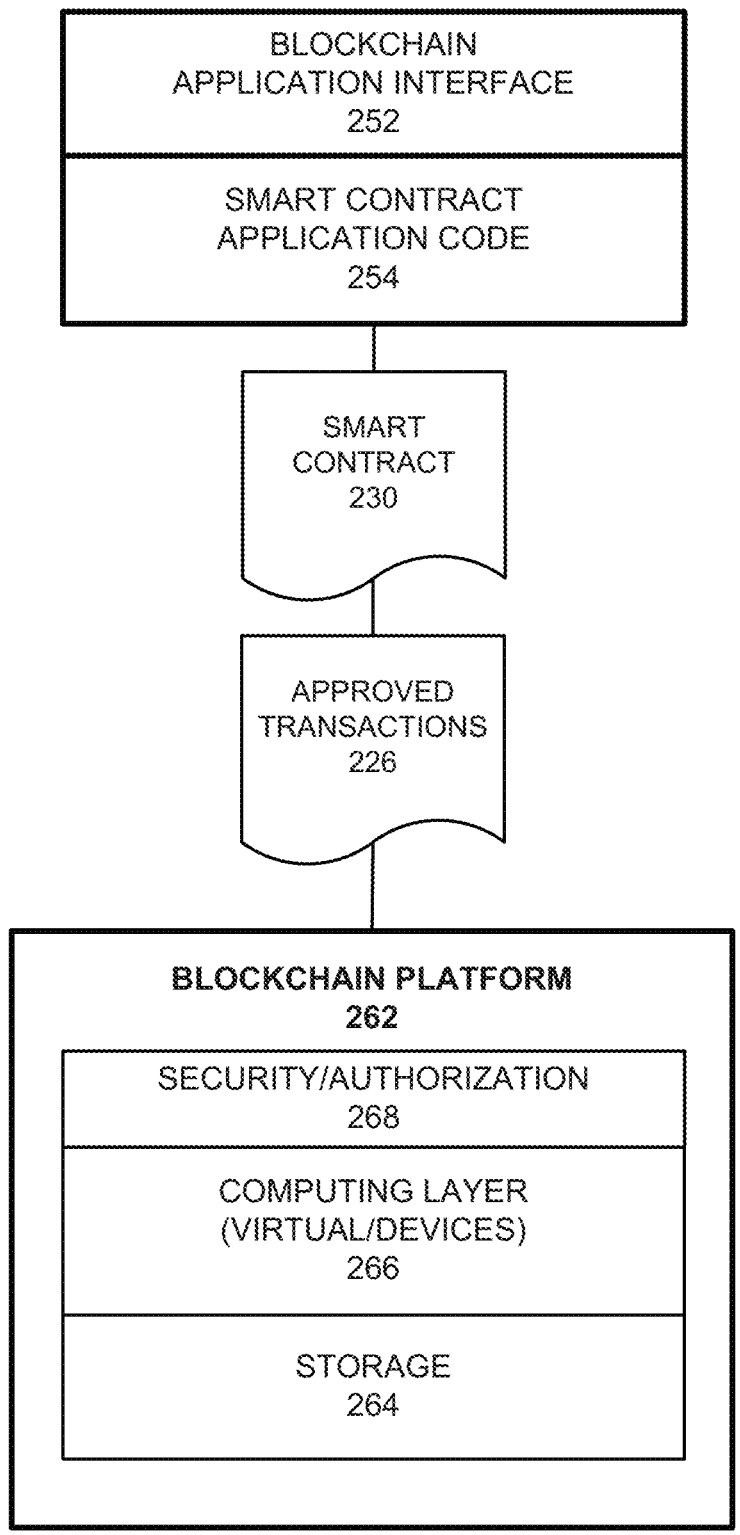
FIG. 2B illustrates a shared ledger configuration, according to example embodiments.

FIG. 2B illustrates a shared ledger configuration, according to example embodiments. Referring to FIG. 2B, the blockchain logic example 250 includes a blockchain application interface 252 as an API or plug-in application that links to the computing device and execution platform for a particular transaction. The blockchain configuration 250 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 254 provides a basis for the blockchain transactions by establishing application code which when executed causes the transaction terms and conditions to become active. The smart contract 230, when executed, causes certain approved transactions 226 to be generated, which are then forwarded to the blockchain platform 262. The platform includes a security/authorization 268, computing devices which execute the transaction management 266 and a storage portion 264 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 2A and 2B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 3A:
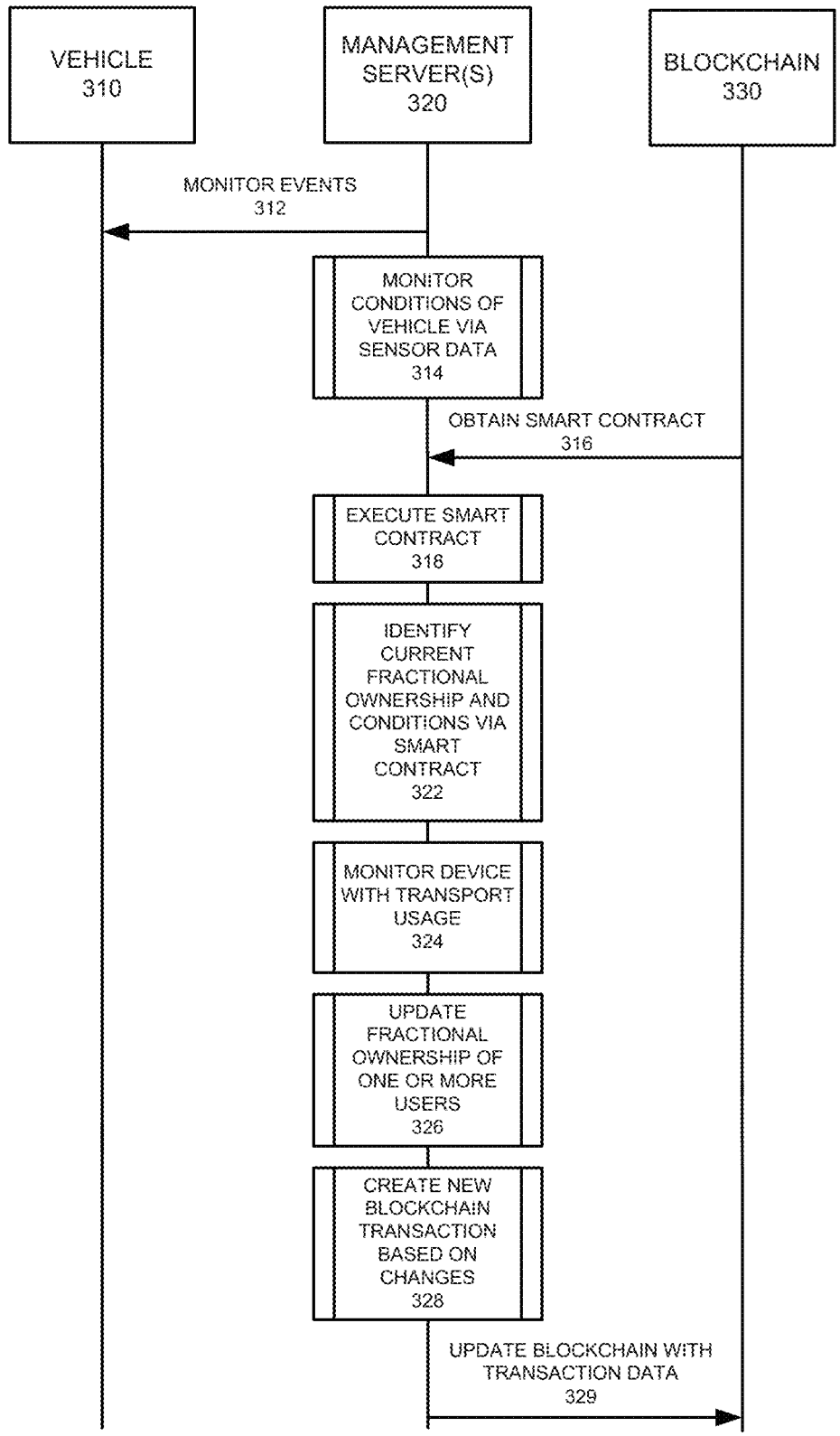
FIG. 3A illustrates a transport fractional ownership setup configuration, according to example embodiments.

FIG. 3A illustrates a transport fractional ownership setup configuration, according to example embodiments. Referring to FIG. 3A, the system 300 provides a transport/vehicle 310, which may be requested, accessed and operated via a user submitted request to initiate a vehicle event, which is then monitored 312 for event status, which may be managed by a management server 320. The server 320 may identify a particular vehicle 310 being requested, used and encountering certain changes, such as miles added, time spent operating, features used, passenger/cargo loads carried, road conditions detected, etc., all of which are detected via sensor data 314. The user profile of the user entity using the vehicle may also be retrieved to apply to the vehicle 310 along with a set of defined vehicle features which are required/prohibited during operation, such as usage only during defined periods. The procedure for accessing and receiving a vehicle may be managed by an obtained smart contract 316 associated with a blockchain 330. The ongoing monitoring of the condition level of the vehicle may be based on sensor data 314. The sensor data may provide periodic updates to the server 320 to indicate whether compliance with a current fractional ownership agreement is being adhered to or whether a change to the agreement is needed in the near future.

The smart contract may be executed 318 to enable a new vehicle monitor event. The vehicle that is ideal for such an event may be identified as available, and a user device may be notified of the new event and any necessary updates. This process may load the user's profile on the vehicle and/or a customized vehicle event file that includes fractional ownership requirements, conditions, etc., retrieved from the user's profile and which are applied to a vehicle computer, via the smart contract 322, so the correct conditions are monitored by the central vehicle controller and the remote management server 320. During operation, such as once the user has started moving with the vehicle, any newly detected conditions (e.g., service needs) may be identified and monitored 324. Such information may be identified and stored in a temporary profile file for subsequent reporting of the vehicle status. For example, when the vehicle identifies a sensor based detection of a maximum usage permitted for a particular day (sensor data exceeds/falls below known threshold(s)), the data is collected and used to populate the temporary service profile. When an analysis is performed to identify the vehicle status, the fractional ownership of the vehicle by the current/recent user is evaluated for compliance. When a user has used the transport for an excessive period of time, reasons beyond the agreement, etc. The fractional ownership agreement may be deemed violated. As a result, another vehicle in the vehicle pool may be paired with the current agreement or with a modified agreement to include additional usage periods time, additional types of usage, additional locations for usage, etc. The updates to the previous fractional ownership agreement can then be updated 326. Then create new blockchain transaction based on the changes 328. All updates are stored in the blockchain 330 via new data transactions 329. In another embodiment, the payment for the usage of the object, such as a transport, is governed and/or occurs in the smart contract.

Figure 3B:
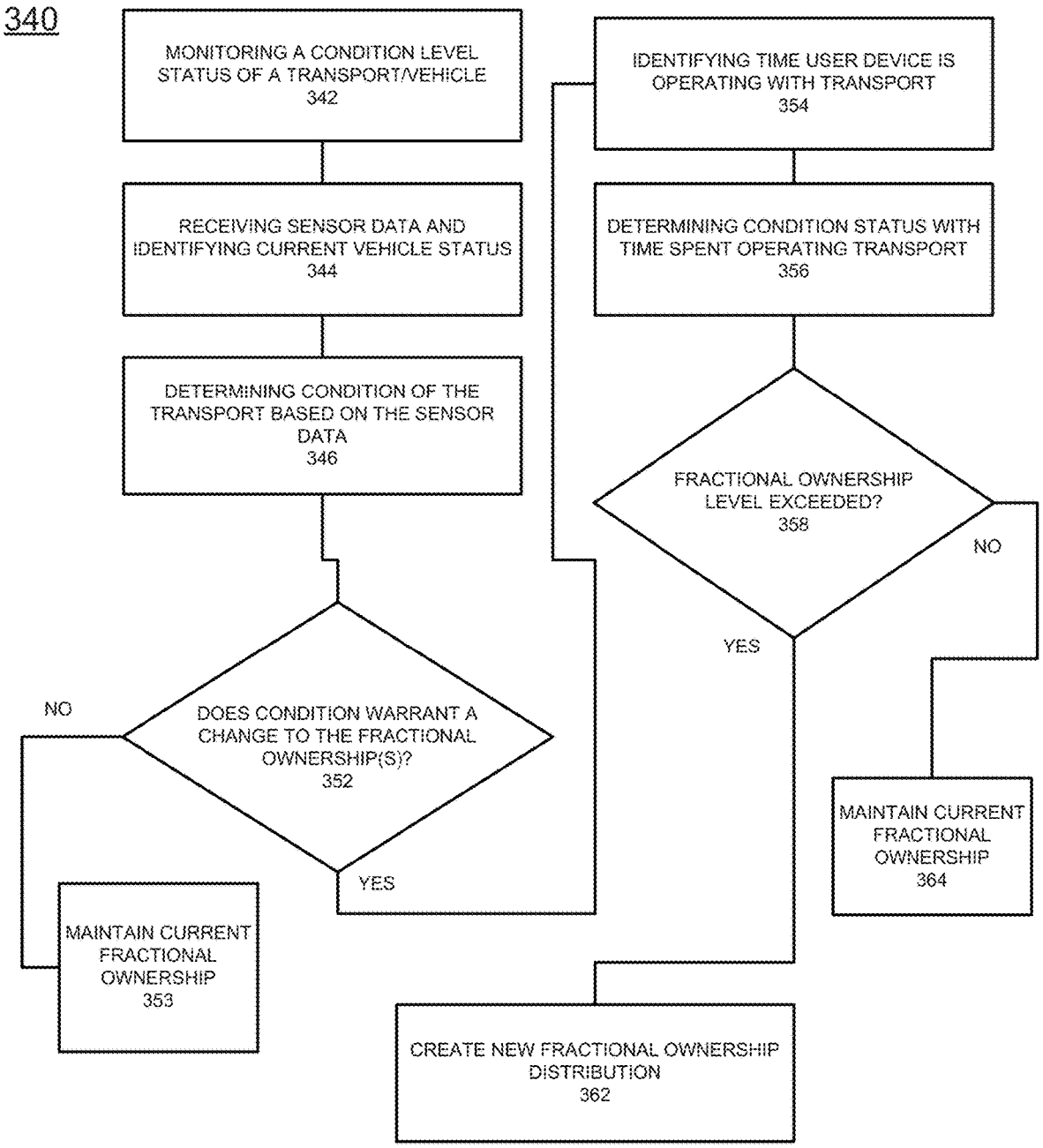
FIG. 3B illustrates a flow diagram of a transport fractional ownership management configuration, according to example embodiments.

FIG. 3B illustrates a flow diagram of a transport service setup configuration, according to example embodiments. Referring to FIG. 3B, the example process 340 includes monitoring a condition level status of a transport/vehicle 342, which may be any of a large number of vehicles sensed conditions identified via sensors installed on the vehicle. The sensor data may be obtained by the vehicle computing device installed on the vehicle or via a user smartphone operating inside or near the vehicle. In one example, the vehicle's status is obtained 344 and compared to known values associated with a previous condition status. The determination as to whether the vehicle has a modified status is based on thresholds of time, sensed conditions (e.g., collision detection, weight hauled by vehicle, passenger usage, etc.) 346. The determination as to whether the vehicle condition warrants a change to a fractional ownership agreement among the owners is performed 352. If the current user and/or other users have not exceeded any conditions, then the fractional ownership agreements may be maintained 353. One way to identify usage compliance is based on time used which may be identified 354 for a particular vehicle event. The condition of the vehicle during such time is also observed 356 to determine deviations from a previous condition. A determination is made as to whether the fractional ownership level is exceeded 358 or not. If a user has used the vehicle during a recent event(s) in a manner that exceeds the terms of their fractional ownership, then a redistribution may occur which may include a larger fractional ownership for one user, and the same or smaller ownerships of other users (e.g., a fractional ownership of 30 percent becomes 40 percent) depending on the new fractional ownership agreement distributed 362. Otherwise, the current fractional ownership agreements may be maintained 364.

In one example, a user may be granted a set number of events which can exceed a fractional ownership agreement, such as three events, and on the fourth event, the user may be prompted to agree to a new fractional ownership which accommodates the user's usage of a particular vehicle. One way to modify the fractional ownership may be to permit a larger/smaller agreement which could increase/decreases current fractional ownership costs and usage rights. In another example, the user device may be the basis for identifying the fractional ownership usage and rights. For example, the user device of a particular user may be identified as being at the same location as a transport. Sensor data may indicate the transport is being operated and the user device may be paired with a location of the transport over time to indicate the user is operating the vehicle. This pairing could be the basis for identifying whether the fractional ownership is being redeemed/used. An updated set of data may be received at a server, such as the sensor data associated with the transport and/or the user device proximate to the transport. Also, an amount of time the user device is paired with the transport may indicate a magnitude of a fractional ownership that is maintained and updated. In one example, a minimum fractional ownership is determined based on the engagement pairing of the user device and the transport. For example, the pairing is confirmed, the usage is estimated and/or determined, and the ownership is then setup to be a fractional ownership based on determined usage and/or previous agreements.

The fractional ownership may be determined based on a trial period of usage. For example, a user may select a transport at a dealer, sign-up for fractional usage, engage the transport in usage events over a trial period, such as two weeks. The fractional ownership agreement can then be created automatically and may be limited to the user's likely usage periods. Additionally, the fractional ownership may be determined based on other users' demand to use the vehicle or subscribe to another fractional ownership agreement with the same vehicle. The more demand for fractional ownership on a particular vehicle equals more opportunity to identify usage time periods and fractional ownership agreement potential.

Figure 3C:
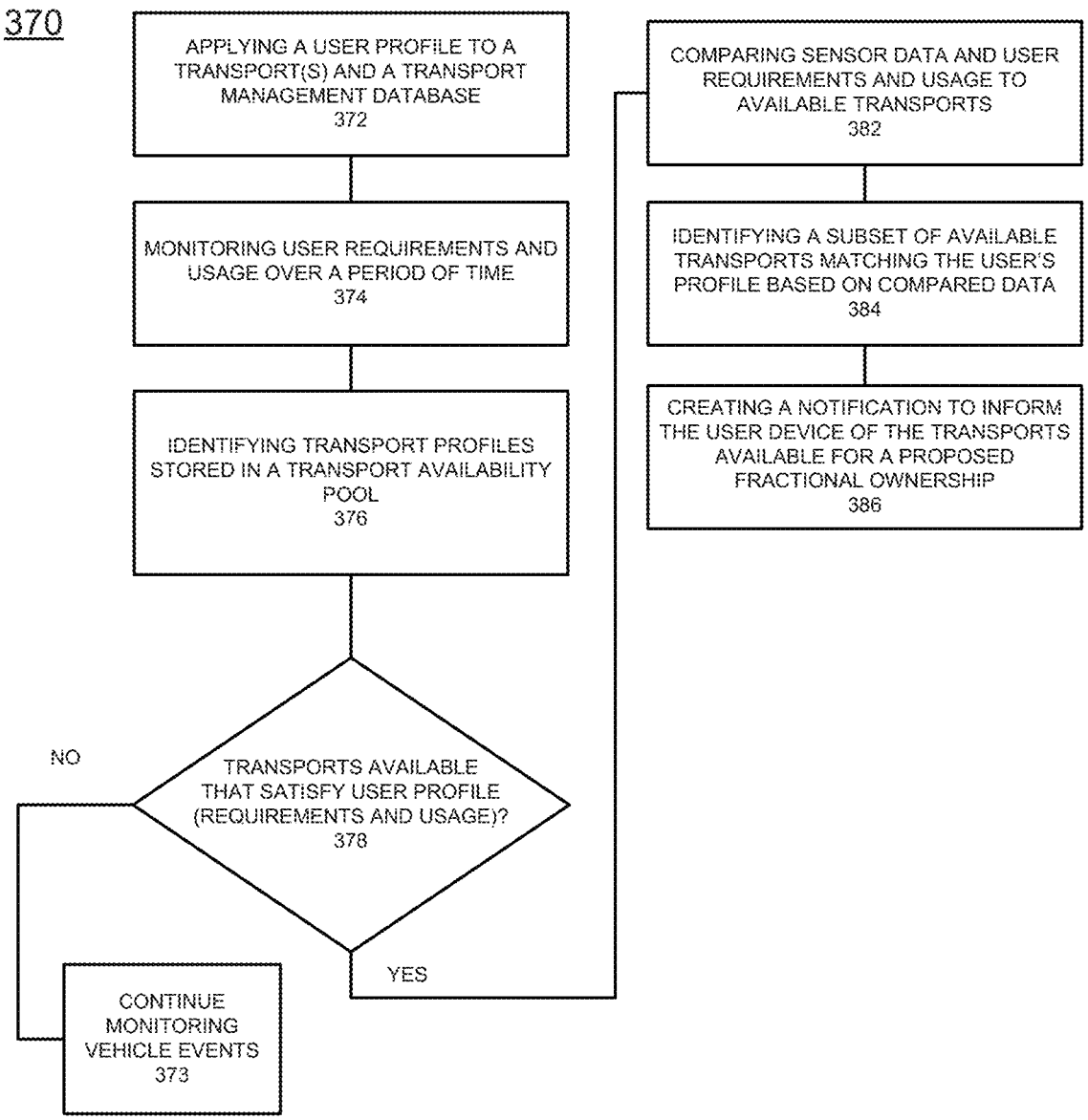
FIG. 3C illustrates flow diagram of another transport fractional ownership management configuration, according to example embodiments.

FIG. 3C illustrates flow diagram of another transport fractional ownership management configuration, according to example embodiments. Referring to FIG. 3C, the example process 370 provides an example of transport(s) being identified for fractional ownership. The user profile of a user may be applied to a transport and a transport management database 372 to identify the user's vehicle event history and usage. The transport usage history may be collected over time to identify the user's needs, requirements, preferences, etc. The database may cross-reference the user's vehicle and profile information to identify candidate vehicles from a candidate pool by monitoring the user requirements 374 (e.g., number of seats, media requirements., towing capacity, suspension options, luxury options, distance traveling options, speed and acceleration, child safety, etc.). The user requirements may be identified from sensor information obtained during monitoring of event(s). The usage data may be based on times of day, frequency, periods of time, and days of the week that the vehicle is used by the particular user. The available vehicles in the pool 376 can then be identified according to their availability and options and whether they satisfy the user profile criteria 378. The resulting available options can be presented to the user in the form of suggested fractional ownership options. For example, if a user is currently renting a vehicle and the user is identified as being a candidate for three vehicles in a pool, then those transports that satisfy those user requirement and usage requirements may be selected as a sub-set pool of potential vehicles for a fractional ownership agreement, where the user does not own any of the vehicles beyond a fractional amount, but has access to one or more vehicles as part of the fractional ownership agreement. If no options are available, the process continues monitoring 373. The options that are available will cause the sensor data of the user's usage, the user requirements and the user usage to be compared to the candidate transports 382. If the user is an avid media user, then a work grade vehicle with no or little media options may be excluded from the user's option list of available transports. If the user requires excellent passenger transport options, such as a ride share professional, then a vehicle with two-seats and/or poor gas mileage may be excluded as a possibility. Once the subset of available transports is selected 384, the user may be automatically notified via an automated notification that presents the transports, the fractional ownership agreement options and other information to the user's device 386.

Figure 4A:
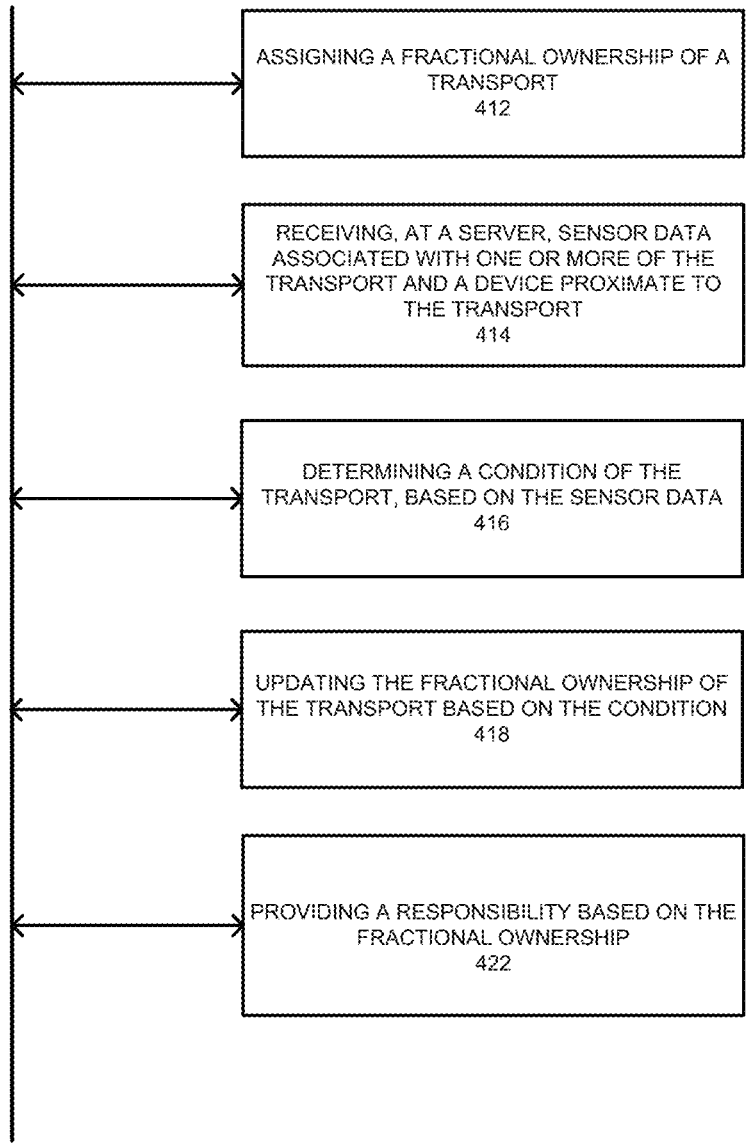
FIG. 4A illustrates a transport fractional ownership management flow diagram, according to example embodiments.

FIG. 4A illustrates a transport fractional ownership management flow diagram, according to example embodiments. Referring to FIG. 4A, the process 400 may include one or more of assigning a fractional ownership of a transport 412, receiving, at a server, sensor data associated with one or more of the transport and a device proximate to the transport 414, determining a condition of the transport, based on the sensor data 416, updating the fractional ownership of the transport based on the condition 418, and providing a responsibility based on the fractional ownership 422, which may be adjusted accordingly depending on the amount of usage, the current fractional ownership agreement, the modified fractional ownership agreement and/or other factors.

The fractional ownership may be associated with the device since the device is what is used to monitor the user's presence with the vehicle. In one example, the fractional ownership is updated based on an amount of time the device is proximate to the transport and the transport is moving, a minimum fractional ownership may be determined to provide the user with a minimum fractional ownership requirement. The condition may be associated with a use of the transport, such as miles driven, impact or collision detection, sensed unexpected conditions (e.g., moisture, heat, cold, etc.). Responsive to receiving sensor data, a smart contract may be retrieved from a distributed ledger to identify one or more sensors required to collect sensor data, one or more thresholds to enforce when reviewing the vehicle compliance data, etc. The fractional ownership associated with the transport may be based on the sensor data. A blockchain transaction may be created to update the fractional ownership of the transport based on the condition of the transport associated with transport sensor data.

The smart contract may identify and have terms or rules for any or more of a date of the service, a location of the service, a time of the service, and a payment for the service. The transport may be a transport which may be rented, such as car, van, truck, motorcycle, RV, water vehicle, scooter, bicycle, drone, and any object that may be used to transport people and or goods from one location to another.

Figure 4B:
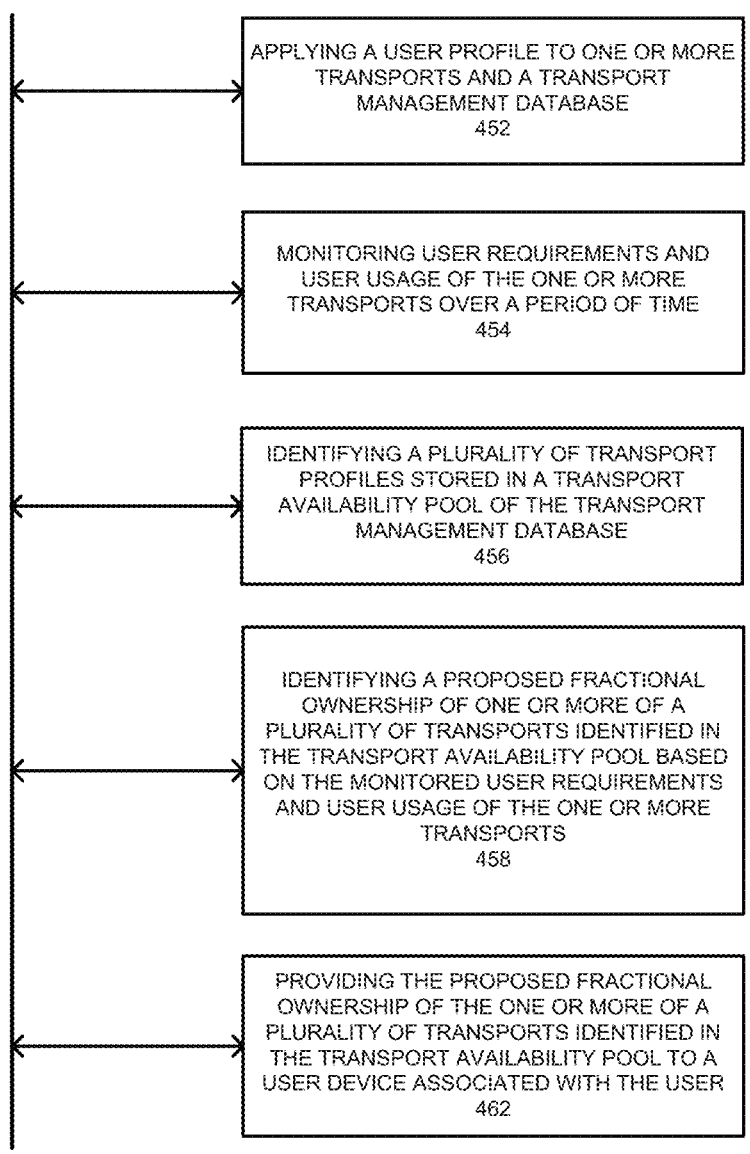
FIG. 4B illustrates another transport fractional ownership management flow diagram, according to example embodiments.

FIG. 4B illustrates another transport fractional ownership management flow diagram, according to example embodiments. Referring to FIG. 4B, the process 450 may include one or more of applying a user profile to one or more transports and a transport management database 452 and monitoring user requirements and user usage of the one or more transports over a period of time 454. The process also includes identifying a plurality of transport profiles stored in a transport availability pool of the transport management database 456, identifying a proposed fractional ownership of one or more of a plurality of transports identified in the transport availability pool based on the monitored user requirements and user usage of the one or more transports 458, and providing the proposed fractional ownership of the one or more of a plurality of transports identified in the transport availability pool to a user device associated with the user 462.

The process may also include receiving sensor data associated with the user usage of the one or more transports over the period of time, such as a week or month of using a particular transport to identify user characteristics. The method may also include determining one or more of the user requirements based on the sensor data, such as features which were used regularly based on profile data, sensor data (i.e., passengers were in the seats of the vehicle as sensed by seat sensors). The process also includes identifying a subset of transports among the plurality of transports in the transport availability pool including transport features which satisfy the user requirements, such as those features which were used on the trial period on the first transport and will be required in future transport use scenarios. The method may also include selecting the subset of transports as the proposed fractional ownership, where the subset includes a portion of the total available transports and not the entire set of available transports. The monitoring of the user requirements and the user usage of the one or more transports over the period of time further includes identifying a plurality of transport events associated with the user profile over a period of time and receiving a plurality of sensor data sets collected for each of the plurality of transport events. The process may also include responsive to receiving the plurality of sensor data sets, identifying the user requirements and the user usage based on one or more of: an amount of time operating the one or more transports, times of days operating the one or more transports, a number of passengers traveling in the one or more transports, a weight carried during the transport events, and road conditions detected by the transport during the transport events, speed and acceleration detected during the transport events, and transport features used during the transport events, and updating the user requirements and the user usage of the one or more transports based on the received plurality of sensor data sets.

The process may also include comparing the updated user usage to the plurality of transports identified in the transport availability pool, determining a subset of transports among the plurality of transports in the transport availability pool comprising transport features which satisfy the updated user requirements, and transmitting a notification the user device with the subset of transports. Also, the process may provide responsive to identifying the user usage and the user requirements, retrieving a smart contract from a distributed ledger, and identifying from the smart contract one or more sensor configurations. The determining whether the sensor data satisfies the one or more sensor configurations provides automatically selecting the one or more of the plurality of transports based on the one or more sensor configurations being satisfied and creating a blockchain transaction comprising the proposed fractional ownership. The examples provide that fractional ownership could be for a minute, hour, day, week, month, year, multiple years, the transport profiles include transport attributes and features, the user requirements include a user schedule, user transport usage history, road conditions, towed items, usage only certain hours, multiple passengers/no passengers, where the user has traveled and will be traveling according to the user's schedule. The usage is based on sensor data collected during the user's usage of a transport. The user may be part of a transport pool, with a fractional percentage ownership of 30 percent and may be at a first level. A more desirable level could be obtained for additional compensation, the reason for an upgrade could be access to more expensive vehicles with more advanced features. If a user wants to access such vehicles on a regular basis, the fractional ownership option to upgrade may be better than a per transaction adjustment which may be less desirable.

Figure 4C:
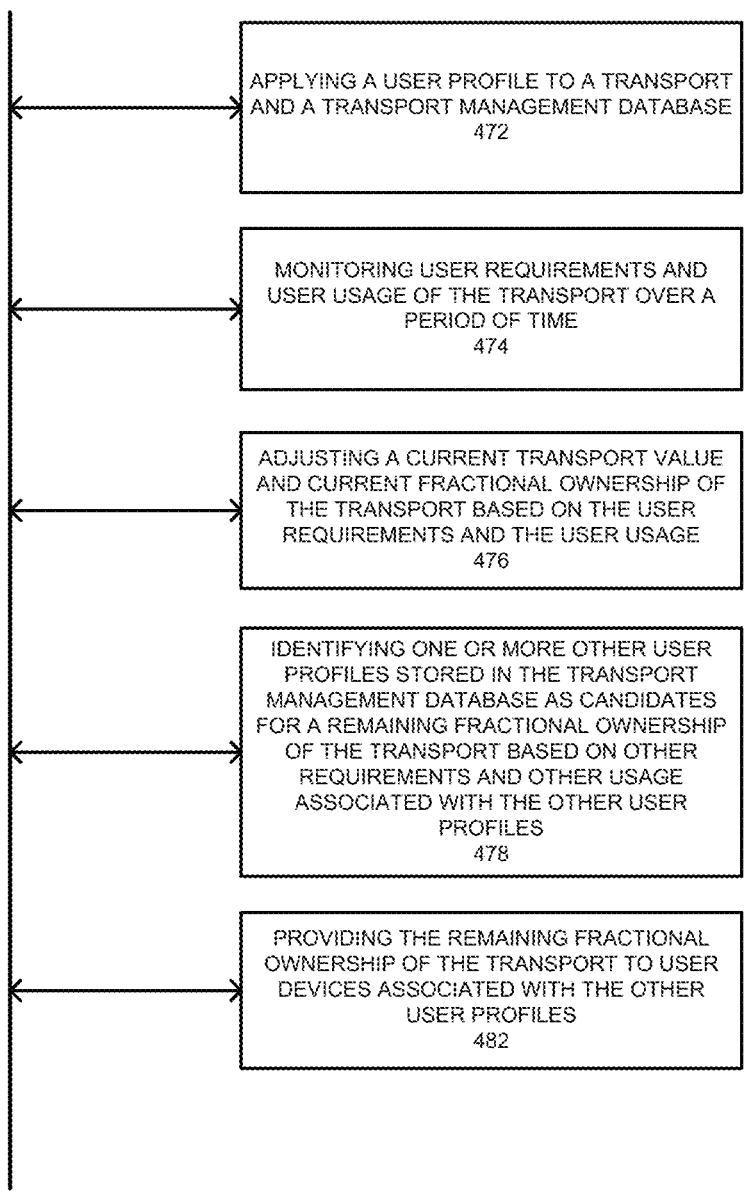
FIG. 4C illustrates yet another fractional ownership management configuration, according to example embodiments.

FIG. 4C illustrates yet another fractional ownership management configuration, according to example embodiments. Referring to FIG. 4C, the process 470 may include one or more of applying a user profile to a transport and a transport management database 472, monitoring user requirements and user usage of the transport over a period of time 474, and adjusting a current transport value and current fractional ownership of the transport based on the user requirements and the user usage 476. For example, the user may use the transport an amount of time and/or ways that reduce the value of the transport on a periodic basis. The process also includes identifying one or more other user profiles stored in the transport management database as candidates for a remaining fractional ownership of the transport based on other requirements and other usage associated with the other user profiles 478, for example, a user may be seeking a particular percentage of a transport at a certain value and those user requests may mature when a particular transport reaches a value that is obtainable by those users' requests. The process also includes providing the remaining fractional ownership of the transport to user devices associated with the other user profiles 482. In this example, the users can setup requests for certain transports at certain values and then receive the fractional ownerships when the transports are identified as available.

Figure 5A:
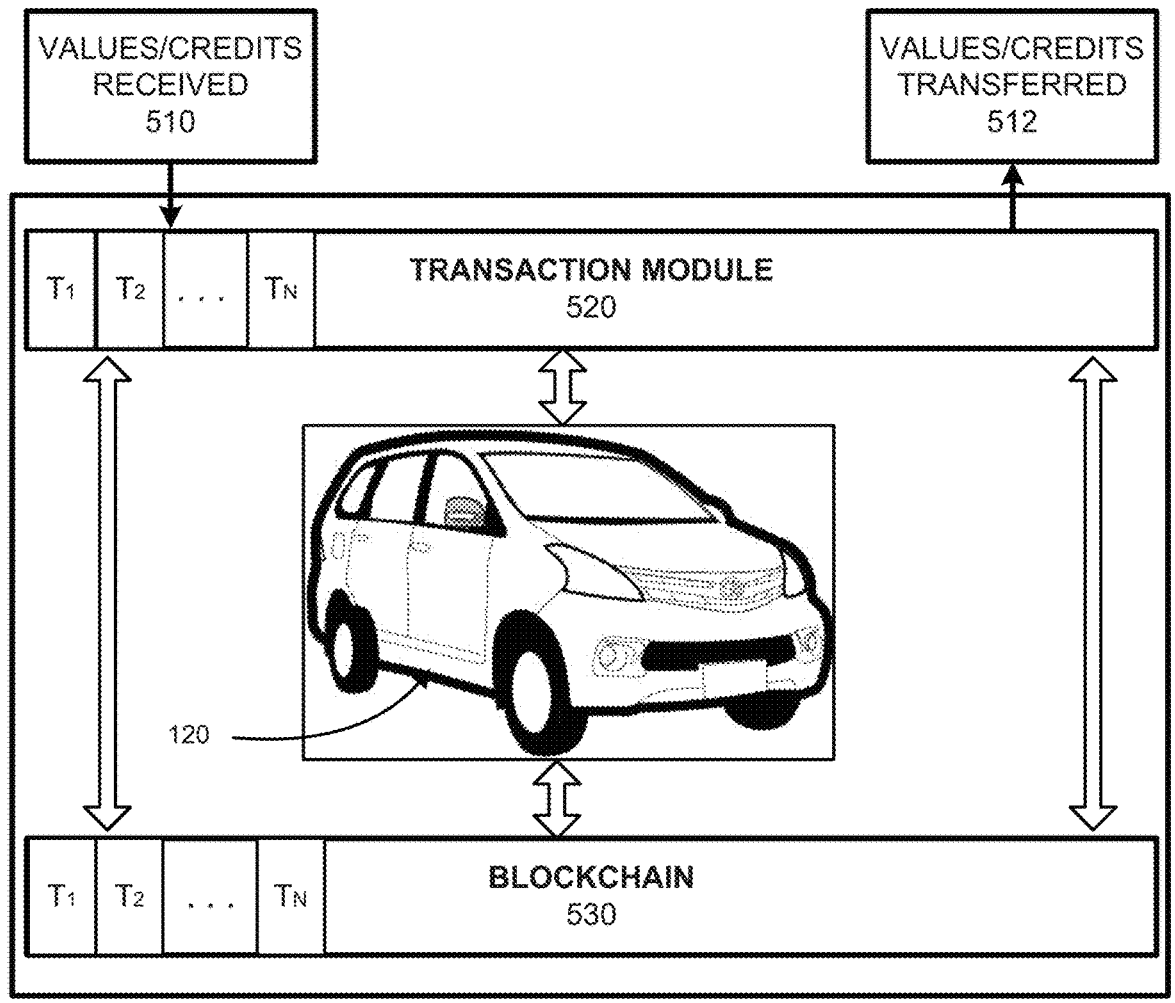
FIG. 5A illustrates an example blockchain transport configuration, according to example embodiments.

FIG. 5A illustrates an example blockchain vehicle configuration 500 for managing blockchain transactions associated with a vehicle, according to example embodiments. Referring to FIG. 5A, as a particular transport/vehicle 120 is engaged in transactions, such as service transactions (e.g., vehicle service, dealer transactions, delivery/pickup, transportation services, etc.), the vehicle may receive values 510 and/or expel/transfer values 512 according to a service transaction(s). The transaction module 520 may record information, such as parties, credits, service descriptions, date, time, location, results, notifications, unexpected events, etc. Those transactions in the transaction module 520 may be replicated into a blockchain 530 which is managed by a remote server and/or remote blockchain peers, among which the vehicle itself may represent a blockchain member and/or blockchain peer. In other embodiments, the blockchain 530 resides on the vehicle 120. When the vehicle is in use according to the terms of a fractional ownership agreement, in one example, the authentication and use are performed via applying a user's profile to the vehicle and the subsequent actions performed may be a new blockchain transaction that is created based on the use event, the vehicle data, the user(s) data, etc. This may be the approach taken to provide compensation for the usage event. The value/credits received and/or transferred can be based on the fractional ownership, as described herein.

Additionally, a voice assistant may be setup on the transport computing device. The voice assistant may be configured to receive and process voice commands which invoke certain actions, such as commands for the transport to perform an automated task. Such tasks may invoke transactions in the blockchain, such as services for the transport, services for the user of the transport and other actions necessary to maintain a user's schedule and/or optimal management of the transport.

Figure 5B:
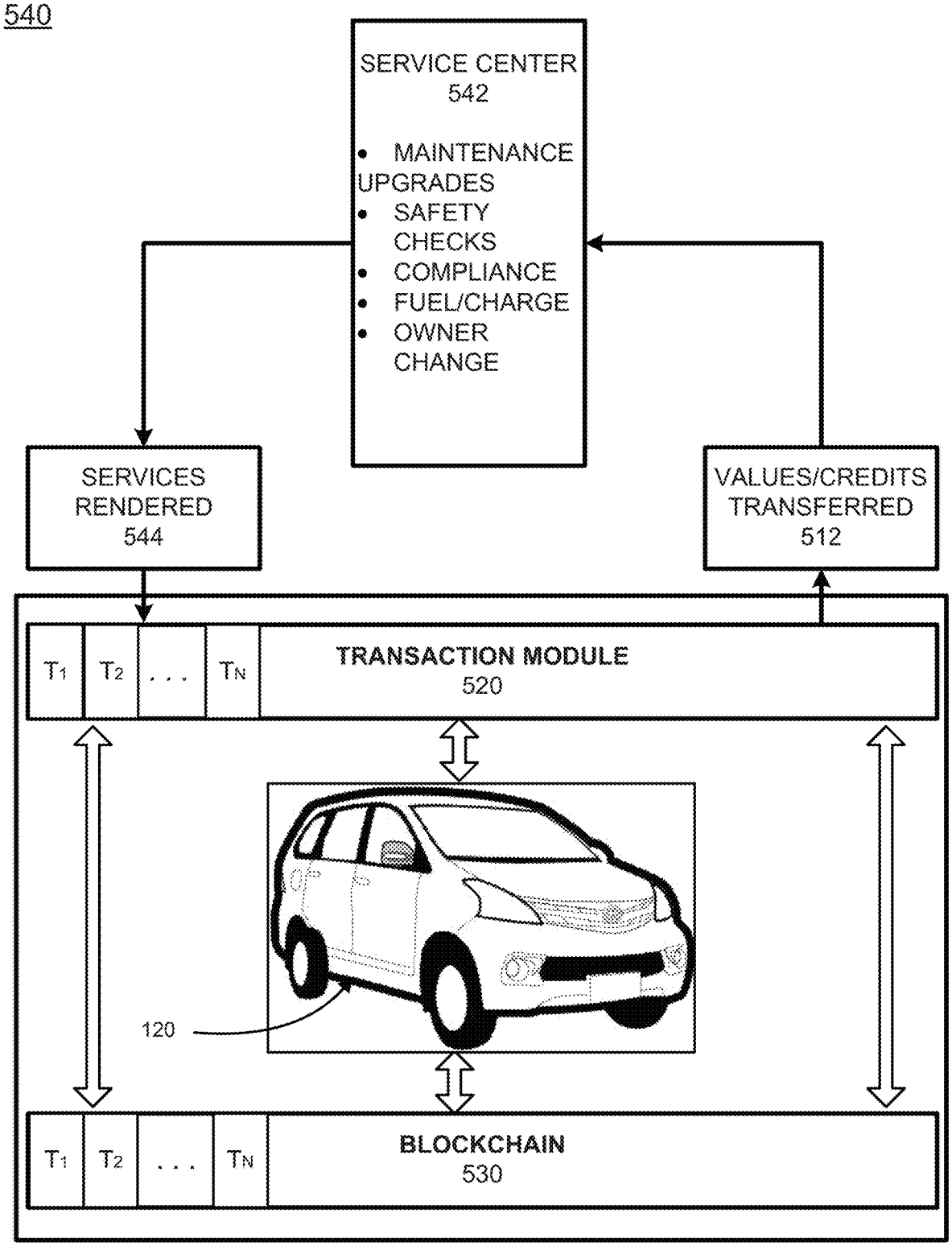
FIG. 5B illustrates another example blockchain transport configuration, according to example embodiments.

FIG. 5B illustrates an example blockchain vehicle configuration 540 for managing blockchain transactions between a service center and a vehicle, according to example embodiments. In this example, the vehicle 120 may have driven itself to a service center 542 (e.g., automotive dealer, local service stop, delivery pickup center, etc.) because the vehicle needs service and/or needs to stop at a particular location. The service center 542 may register the vehicle for a service call at a particular time, with a particular strategy, such as oil change, battery charge, refuel, recharge, or replacement services, such as tire change or replacement, and any other transport related service. The services rendered 544 may be performed based on a smart contract which is downloaded from or accessed via the blockchain 530 and identified for permission to perform such services for a particular rate of exchange. The services are logged in the transaction log of the transaction module 520, the credits 512 are transferred to the service center 542 and the blockchain may log transactions to represent all the information regarding the recent service. In other embodiments, the blockchain 530 resides on the vehicle 120 and/or the service center 542. In one example, a transport event may require a refuel or other vehicle service and the user may then be responsible for the responsibility value increase for such a service. The service may be rendered via a blockchain notification which is then used to redistribute the responsibility value to the user via their respective fractional responsibility values. Adherence to a regular service schedule may be part of the adherence rate or compliance necessary to achieve an optimal user vehicle status. A service stop may/may not be a permissible action permitted by a vehicle event associated with a particular occupant/target user, depending on their status. Additionally, if the vehicle prompted a user to make a service stop and the user refused, this inaction could cause a user status deduction and/or a vehicle condition deduction which is added to the overall user rating and/or damages list, which the user could be responsible for at the end of the event. Responsibility for the service center activities can be based on the fractional ownership as described herein.

Figure 5C:
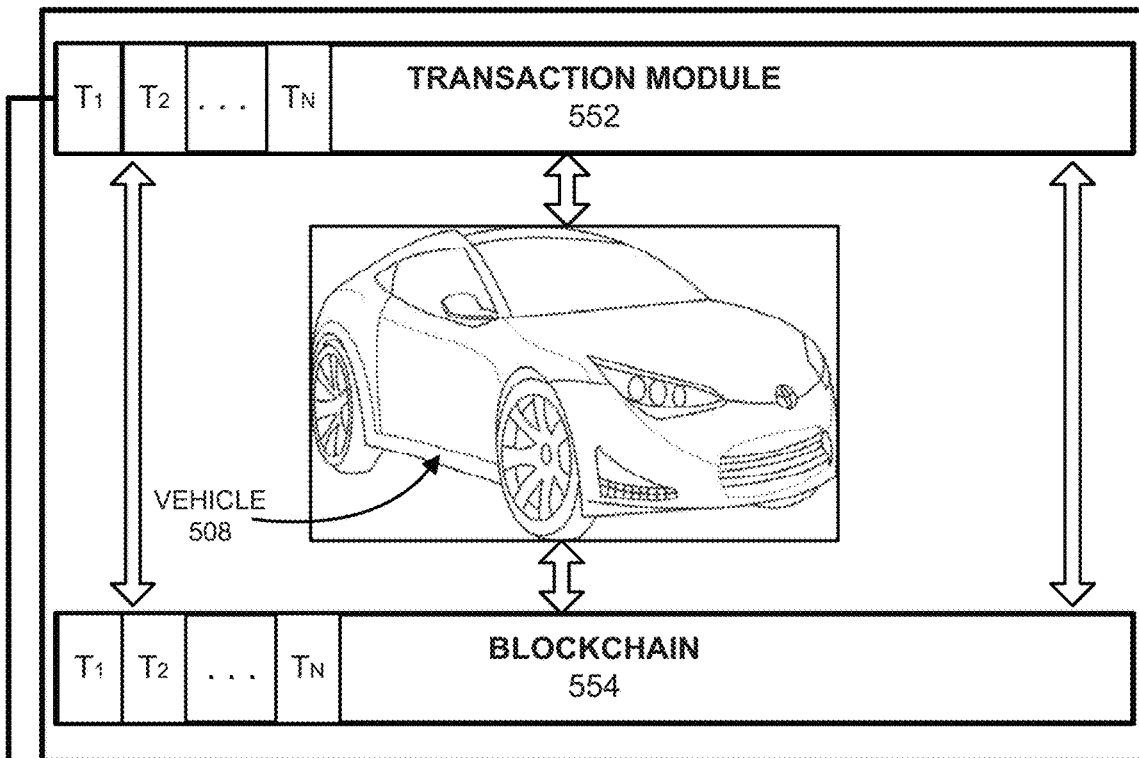
FIG. 5C illustrates a further example blockchain transport configuration, according to example embodiments.
Figure 5C:
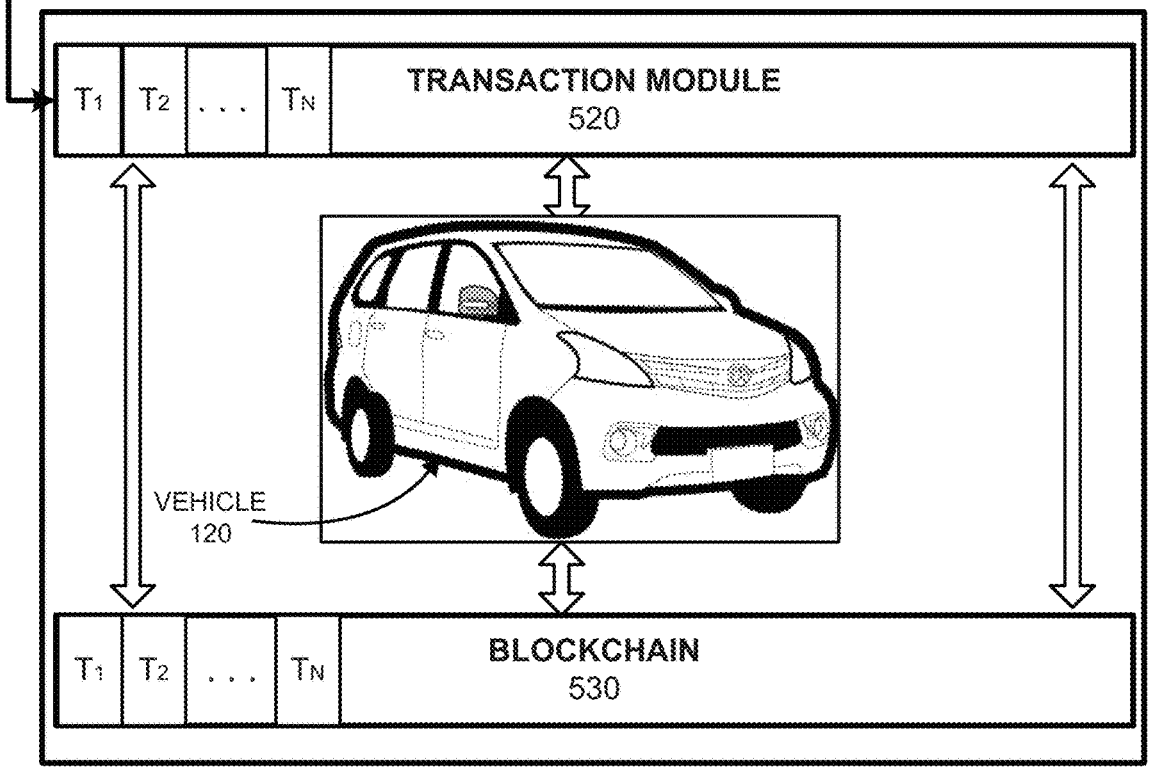

FIG. 5C illustrates an example blockchain vehicle configuration 550 for managing blockchain transactions conducted among various vehicles, according to example embodiments. The vehicle 120 may engage with another vehicle 508 to perform various actions, such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. The vehicle 508 may notify another vehicle 120 which is in its network and which operates on its blockchain member service. The vehicle 120 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 120 and the record of the transferred service is logged in the blockchain 530/554 assuming that the blockchains are different from one another, or, are logged in the same blockchain used by all members. In this example, if the user was permitted to use the vehicle to perform certain services, such as passenger services, fractional ownership service requests or other services to another vehicle, or to perform similar actions, then the blockchain may use the smart contract to identify the terms of the agreement and ultimately log the transaction in the vehicle related blockchains as a result of having completed such tasks. Responsibility for the transferred credits can be based on the fractional ownership as described herein.

Figure 6:
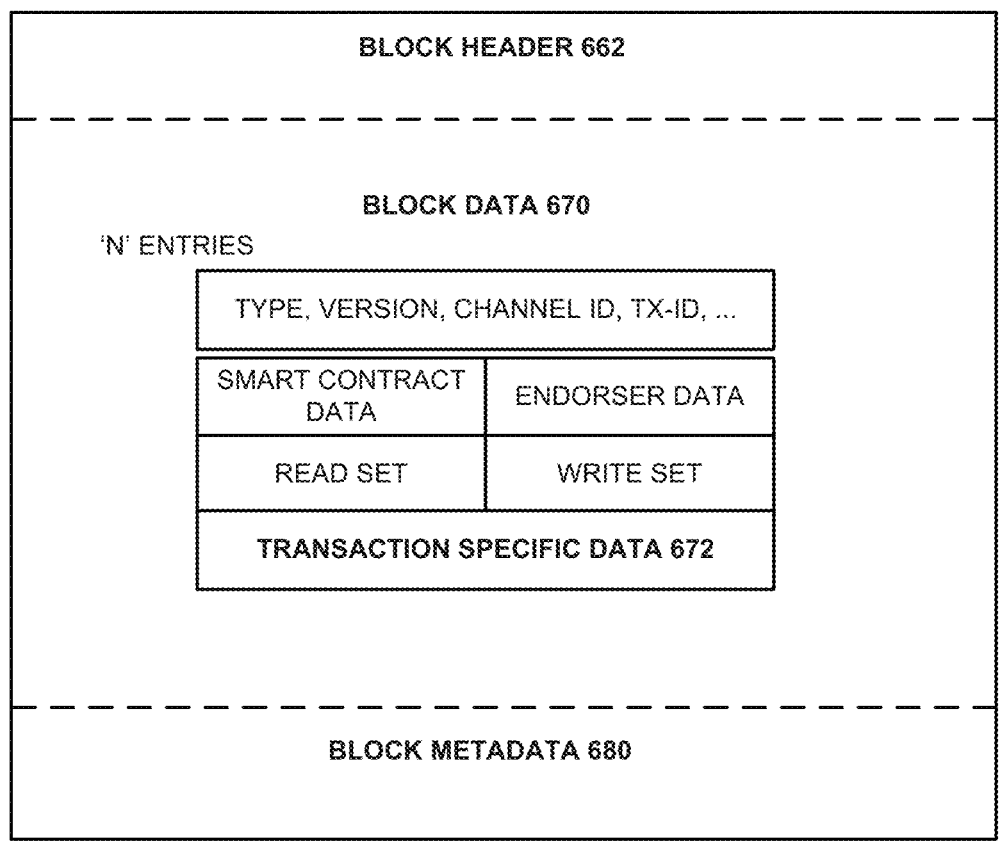
FIG. 6 illustrates an example data block, according to example embodiments.

FIG. 6 illustrates a blockchain block 600 that can be added to a distributed ledger, according to example embodiments, and contents of a block structure 660. Referring to FIG. 6, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The process of endorsing an entry depends on an endorsement policy which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a new data block 660 for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6, a block 660 (also referred to as a data block) that is stored on the blockchain and/or the distributed ledger may include multiple data segments such as a block header 662, transaction specific data 672, and block metadata 680. It should be appreciated that the various depicted blocks and their contents, such as block 660 and its contents are merely for purposes of an example and are not meant to limit the scope of the example embodiments. In some cases, both the block header 662 and the block metadata 680 may be smaller than the transaction specific data 672 which stores entry data, however this is not a requirement. The block 660 may store transactional information of N entries (e.g., 100, 500, 1000, 2000, 3000, etc.) within the block data 670. The block 660 may also include a link to a previous block (e.g., on the blockchain) within the block header 662. In particular, the block header 662 may include a hash of a previous block's header. The block header 662 may also include a unique block number, a hash of the block data 670 of the current block 660, and the like. The block number of the block 660 may be unique and assigned in an incremental/sequential order starting from zero. The first block in the blockchain may be referred to as a genesis block which includes information about the blockchain, its members, the data stored therein, etc.

The block data 670 may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client input (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 670 may also store transaction specific data 672 which adds additional information to the hash-linked chain of blocks in the blockchain. Accordingly, the data 672 can be stored in an immutable log of blocks on the distributed ledger. Some of the benefits of storing such data 672 are reflected in the various embodiments disclosed and depicted herein. The block metadata 680 may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 670 and a validation code identifying whether an entry was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
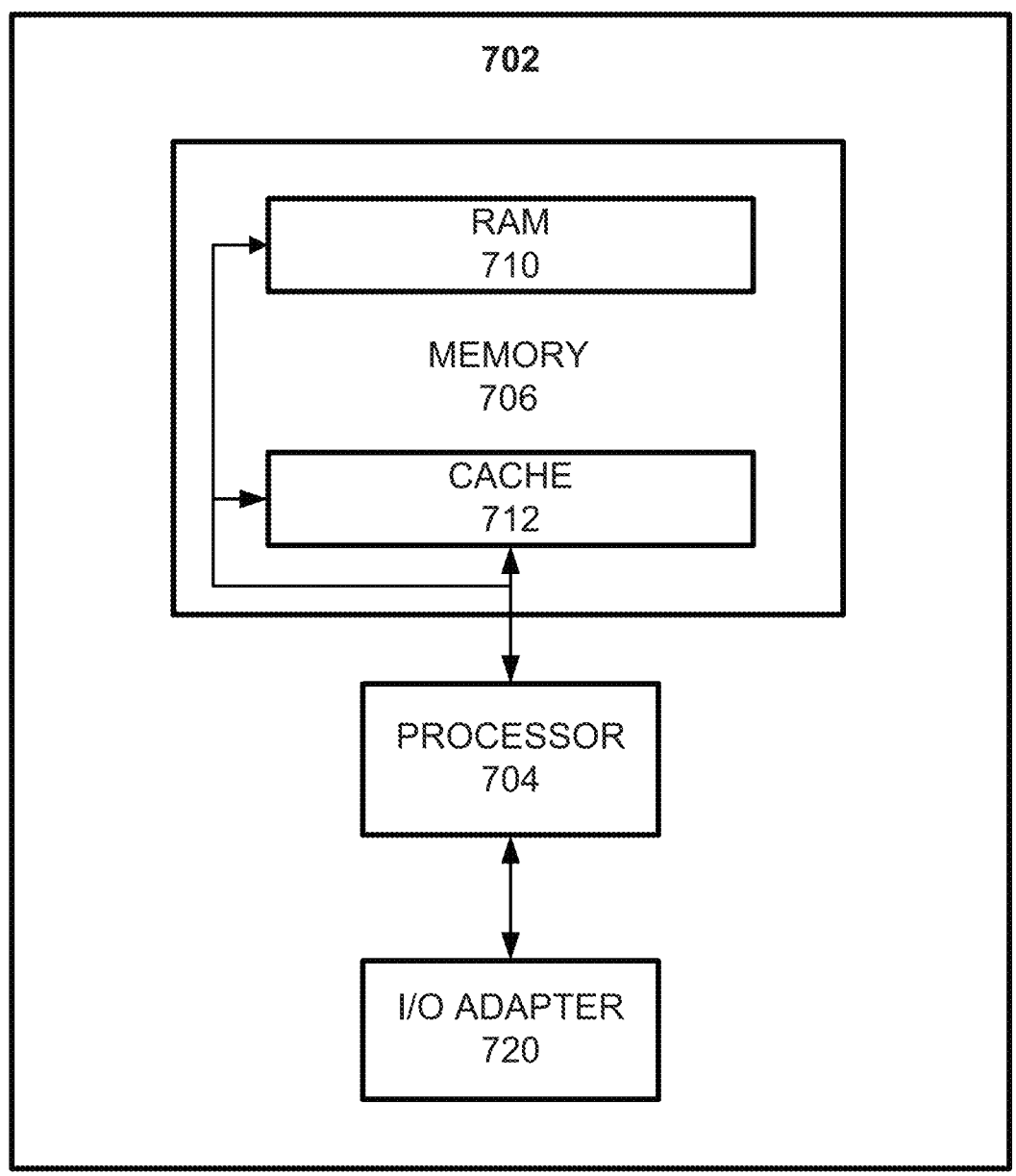
FIG. 7 illustrates an example system that can be used with one or more of the example embodiments.

FIG. 7 is not intended to suggest any limitation as to the scope of use or functionality of embodiments of the application described herein. Regardless, the computing node 800 is capable of being implemented and/or performing any of the functionality set forth herein.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via the I/O Adapter 720 such as a keyboard, a pointing device, a display, etc.; one or more devices that enable a user to interact with computer system/server 702; and/or any devices (e.g., network card, modem, etc.) that enable computer system/server 702 to communicate with one or more other computing devices. Such communication can occur via I/O interfaces. Still yet, computer system/server 702 can communicate with one or more networks such as a local area network (LAN), a general wide area network (WAN), and/or a public network (e.g., the Internet) via a network adapter. The network adapter communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    storing a first value of a transport to a first profile of a first user and a second value of the transport to a second profile of a second user on a blockchain ledger based on an agreement between the first and second profiles stored on the blockchain ledger;
    detecting a first mobile device of the first user being paired with the transport for a first amount of time during a predetermined period and logging the first amount of time that the first mobile device is paired with the transport;
    detecting a second mobile device of the second user being paired with the transport for a second amount of time during the predetermined period and logging the second amount of time that the second mobile device is paired with the transport;
    determining a difference between the first amount of time that the first mobile device is paired with the transport and the second amount of time that the second mobile device is paired with the transport;
    determining to change the agreement between the first profile and the second profile based on the difference between the first amount of time that the first mobile device is paired with the transport and the second amount of time that the second mobile device is paired with the transport;
    modifying the agreement based on the difference, wherein the modifying comprises executing a smart contract which writes modifications to the first profile and the second profile stored on the blockchain ledger in proportion to the first amount of time that the first mobile device is paired with the transport and the second amount of time that the second mobile device is paired with the transport, respectively; and
    storing logged data that is a basis of the modifying within the agreement on the blockchain ledger.

2. The method of claim 1, wherein the first profile is associated with the first mobile device of the first user.

3. The method of claim 1, wherein the detecting the first mobile device comprises detecting the first amount of time when the transport is moving.

4. The method of claim 3, wherein a minimum fractional ownership is determined.

5. The method of claim 1, further comprising:
    retrieving the smart contract from the blockchain ledger; and
    identifying, from the smart contract one or more of: sensors required to collect sensor data; and a fractional ownership associated with the transport based on the sensor data.

6. The method of claim 1, further comprising:
    creating a blockchain transaction to modify the first and second profiles stored on the blockchain ledger based on the determination and committing the blockchain transaction to the blockchain ledger.

7. A system, comprising:
    a memory configured to store a blockchain ledger; and
    a processor configured to
        store a first value of a transport to a first profile of a first user and a second value of the transport to a second profile of a second user on the blockchain ledger based on an agreement between the first and second profiles, respectively;

detect a first mobile device of the first user being paired with the transport for a first amount of time during a predetermined period and log the first amount of time that the first mobile device is paired with the transport;

detect a second mobile device of the second user being paired with the transport for a second amount of time during the predetermined period and log the second amount of time that the second mobile device is paired with the transport;

determine a difference between the first amount of time that the first mobile device is paired with the transport and the second amount of time that the second mobile device is paired with the transport;

determine to change the agreement between the first profile and the second profile based on the difference between the first amount of time that the first mobile device is paired with the transport and the second amount of time that the second mobile device is paired with the transport;

modify the agreement based on the difference, wherein the modification comprises execution of a smart contract which writes modifications to the first profile and the second profile stored on the blockchain ledger in proportion to the first amount of time that the first mobile device is paired with the transport and the second amount of time that the second mobile device is paired with the transport, respectively; and store logged data that is a basis of the modification within the agreement on the blockchain ledger.

8. The system of claim 7, wherein the first profile is associated with a user the first mobile device of the first user.

9. The system of claim 7, wherein the processor is configured to detect the first amount of time while the transport is in motion.

10. The system of claim 9, wherein a minimum fractional ownership is determined.

11. The system of claim 7, wherein the processor is further configured to:
retrieve the smart contract from the blockchain ledger; and
identify, from the smart contract one or more of: sensors required to collect sensor data; and a fractional ownership associated with the transport based on the sensor data.

12. The system of claim 7, further comprising:
create a blockchain transaction to modify the first and second profiles stored on the blockchain ledger and commit the blockchain transaction to the blockchain ledger.

13. A non-transitory computer readable medium comprising instructions, that when read by a processor, cause the processor to perform:

storing a first value of a transport to a first profile of a first user and a second value of the transport to a second profile of a second user on a blockchain ledger based an agreement between the first and second profiles stored on the blockchain ledger;

detecting a first mobile device of the first user being paired with the transport for a first amount of time during a predetermined period on a user device of the first user being inside of the transport and logging the first amount of time that the first mobile device is paired with the transport;

detecting a second mobile device of the second user being paired with the transport for a second amount of time during the predetermined period and logging the second amount of time that the second mobile device is paired with the transport;

determining a difference between the first amount of time that the first mobile device is paired with the transport and the second amount of time that the second mobile device is paired with the transport;

determining to change the agreement between the first profile and the second profile based on the difference between the first amount of time that the first mobile device is paired with the transport and the second amount of time that the second mobile device is paired with the transport;

modifying the agreement based on the difference, wherein the modifying comprises executing a smart contract which writes modifications to the first profile and the second profile stored on the blockchain ledger in proportion to the first amount of time that the first mobile device is paired with the transport and the second amount of time that the second mobile device is paired with the transport, respectively; and storing logged data that is a basis of the modifying within the agreement on the blockchain ledger.

14. The non-transitory computer readable medium of claim 13, wherein the first profile is associated with the first mobile device of the first user.

15. The non-transitory computer readable medium of claim 14, wherein the proximate to the transport and detecting the first mobile device comprises detecting the first amount of time when the transport is moving.

16. The non-transitory computer readable medium of claim 15, wherein a minimum fractional ownership is determined.

17. The non-transitory computer readable medium of claim 13, further comprising:
retrieving the smart contract from the blockchain ledger; and
identifying, from the smart contract one or more of: sensors required to collect sensor data; and a fractional ownership associated with the transport based on the sensor data.

* * * * *